United States Patent
Satoda

(10) Patent No.: US 6,545,699 B2
(45) Date of Patent: Apr. 8, 2003

(54) TELECONFERENCING SYSTEM, CAMERA CONTROLLER FOR A TELECONFERENCING SYSTEM, AND CAMERA CONTROL METHOD FOR A TELECONFERENCING SYSTEM

(75) Inventor: Kozo Satoda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/865,416

(22) Filed: May 29, 2001

(65) Prior Publication Data

US 2001/0055059 A1 Dec. 27, 2001

(30) Foreign Application Priority Data

May 26, 2000 (JP) ........................................ 2000-157354

(51) Int. Cl.7 .................................................. H04N 7/14
(52) U.S. Cl. ................................ 348/14.05; 348/14.08; 348/14.09
(58) Field of Search .......................... 348/14.01, 14.02, 348/14.03, 14.04, 14.05, 14.07, 14.08, 14.09, 14.12, 14.1, 211; 370/260, 261; 709/204, 205; 345/753, 755; 382/236, 103; H04N 7/14

(56) References Cited

FOREIGN PATENT DOCUMENTS

| JP | 4-234284 | 8/1992 | | |
|---|---|---|---|---|
| JP | 4-249991 | 9/1992 | | |
| JP | 5-122689 | 5/1993 | | |
| JP | 5-153582 | 6/1993 | | |
| JP | 5-244587 | 9/1993 | | |
| JP | 5-268599 | 10/1993 | | |
| JP | 6-276514 | 9/1994 | | |
| JP | 407095462 A | * | 4/1995 | .......... H04N/5/232 |
| JP | 7-140527 | 6/1995 | | |
| JP | 8-298652 | 11/1996 | | |
| JP | 409153138 A | * | 6/1997 | ............. G06T/7/20 |
| JP | 2737682 | 1/1998 | | |

* cited by examiner

Primary Examiner—Melur Ramakrishnaiah
(74) Attorney, Agent, or Firm—Foley & Lardner

(57) ABSTRACT

A teleconferencing system has a speaker direction detection means, which detects the direction of a speaker from the phase difference of voice inputs to a plurality of microphones, and an imaging control means, which directs a camera in the detected direction. A movement pixel detection means detects a moving part of the image captured by the camera, using a frame differencing, the distribution of which is measured by a movement distribution measurement means, and the position of person is detected by a speaker position establishing means. Even in the case in which a speaker is not captured at the center of an image, the imaging control means can move the camera so as to enable capturing of the person at the center of the image with an appropriate picture angle, thereby enabling proper capturing of the image of the speaker.

36 Claims, 4 Drawing Sheets

(a) ORIGINAL IMAGE   (b) DIFFERENTIAL IMAGE   (c) MOVEMENT DISTRIBUTION (a) ORIGINAL IMAGE    (b) DIFFERENTIAL IMAGE    (c) MOVEMENT DISTRIBUTION

TELECONFERENCING SYSTEM, CAMERA CONTROLLER FOR A TELECONFERENCING SYSTEM, AND CAMERA CONTROL METHOD FOR A TELECONFERENCING SYSTEM

BACKGROUND OF THE INVENTION

1. Field of the Invention

The present invention relates to a teleconferencing system, a camera controller for a teleconferencing system, and a camera control method for a teleconferencing system, and more particularly to a controller that controls the camera imaging angle and picture angle so as to properly capture the picture of a speaker in a meeting.

2. Related Art

In the past, a controller has been developed whereby a plurality of microphones were provided in a teleconferencing terminal, and automatic selection was performed of a speaker from the participants in the teleconference, so that a camera is aimed at this speaker.

For example, in a method disclosed in the Japanese unexamined patent publication (KOKAI) No.5-122689, microphones are installed for each participant, and camera is aimed at the microphone with the maximum sound level, so as to capture a picture of a speaker.

In a method disclosed in the Japanese unexamined patent publication (KOKAI) No.7-140527, the direction from which a sound is heard is detected from the phase difference in voices input from a plurality of microphones.

Another method that has been developed is a method whereby a person is detected from an imaged picked up by a camera, and the camera is pointed in that direction. For example, in the Japanese unexamined patent publication (KOKAI) No.4-234284, a frame differencing between sequential images is used to measure the distribution of movement in the horizontal direction, thereby detecting the direction of a person in the picture.

In the Japanese unexamined patent publication (KOKAI) No.5-268599, a contour is detected from an image, and matching is performed with the shape of a person, so as to detect a person.

A method for reliably imaging a speaker is disclosed in the Japanese unexamined patent publication (KOKAI) No.5-244587, for example, whereby a separate wide-angle camera is provided.

In the Japanese unexamined patent publication (KOKAI) No.8-29652, there is a proposed method whereby, after detection of a person by his or her voice, the contour of the person is detected from an image, and the aiming of the camera is corrected accordingly.

In the above-noted prior art, however, in which a plurality of microphones is used and the camera is aimed at only the one from which the sound level is maximum, is only possible in the case in which the directions of the microphone and the speaker coincide, and if the direction of the speaker is shifted from the direction of the microphone, it is not possible to capture the image of the speaker in the center.

Additionally, in the method using the phase difference, there is a large error, and it is difficult to position the speaker in the center of the camera.

In other methods of capturing the speaker in the center of the camera using an image, the methods are not suitable for cases in which the speaker is not already somewhere within the image, and in a method using a separately provided wide-angle camera to capture the speaker, the overall cost of the teleconferencing system becomes high.

In a proposed method whereby correction is done by an image after a rough detection is done by voices, a contour is determined within an image, and a person is detected therefrom. However, the method of using a contour has the problem of requiring a large amount of calculation if a large number of objects are present within the meeting room.

Additionally, this method does not consider a means for capturing a person at a proper picture angle.

Accordingly, it is an object of the present invention to improve on the drawbacks of the prior art as noted above, by providing a teleconferencing system, which uses a simple configuration to aims a camera, which serves as an imaging means, reliably and accurately at a speaker, based voice information of the speech of the speaker, and which also enables capture of a picture of the speaker at a proper picture angle.

SUMMARY OF THE INVENTION

To achieve the above-noted objects, the present invention adopts the following base technical constitution.

Specifically, a first aspect of the present invention is a teleconferencing system having a plurality of sound-collection means, at least one speaker-imaging means, an image-display means, and an imaging control means, which, based on voice direction information of a speaker obtained from the sound-collection means, changes the imaging direction of the imaging means that images the speaker, wherein the imaging control means is controlled so as to direct the imaging direction of the speaker-imaging means toward the direction of a speaker predicted by the sound-collection means, and wherein the imaging control means is configured so that movement pixels are extracted from the captured image, and a distribution of the movement pixels is determined, so as to identify the direction of the speaker within the image, and so that, based on the direction information of the speaker, the speaker is displayed in a pre-scribed position within the image area.

A second aspect of the present invention is a teleconferencing system having a plurality of sound-collection means, a speaker-imaging means, which images a speaker, a speaker direction detection means, which, based on information from the sound-collection means, predicts the direction of a speaker, a first imaging control means, which, based on information of the speaker direction detection means, changes the facing direction of the speaker-imaging means, an image-display means, which, in response to a control signal of the first imaging control means, displays a captured image of the speaker-imaging means caused to be faced to a prescribed direction, a movement pixel detection means, which detects movement pixels from the captured image, a movement distribution measurement means, which measures the distribution of movement from the movement pixels detected by the movement pixel detection means, a speaker position establishing means, which, based on the measurement results from the movement distribution measurement means, establishes the position of a speaker in the image, and a second imaging control means, which, based on information of the speaker position establishing means, performs further control of the facing direction of the imaging means.

A third aspect of the present invention is a control method for a speaker-imaging means in a teleconferencing system having a plurality of sound-collection means, at least one speaker-imaging means, and an imaging control means, which, based on voice direction information of a speaker obtained from the sound-collection means, charges the imaging direction of the speaker-imaging means that images the speaker, this method having a first step of predicting the direction of a speaker, from speaker voice sound information collected from each of the sound-collection means, a second step of, based on the speaker direction information predicted by the first step, causing the first imaging control means to drive the speaker-imaging means, so as to direct the imaging direction axis of the speaker-imaging means toward the predicted direction of the speaker, a third step of displaying an image captured by the speaker-imaging means on an image display apparatus, a fourth step of extracting movement pixel information from the captured image information, a fifth step of calculating a movement distribution from the extracted movement pixel information, a sixth step of establishing the position of a speaker in the captured image, from the movement distribution information, and a seventh 7' step of, from the position information of the speaker within the captured image, the second first imaging control means adjusting a zoom mechanism of the speaker-imaging means so as to adjust the size of the speaker in the captured image.

By adopting the above-noted technical constitution, a teleconferencing system and a camera controller and camera control method for a teleconferencing system according to the present invention has a speaker direction detection means, which detects the direction of a speaker from a phase difference input into each one of a plurality of the microphones or from the voice levels detected by the plurality of microphones, and an imaging control means, which directs a camera to the detected direction, wherein a moving part of a picture picked up by a camera directed at a speaker by means of his or her voice is detected, a movement distribution measurement means measuring the movement distributions thereof in the horizontal and vertical directions, and the position and size of a person being detected by a speaker position establishing means, from the horizontal-direction and vertical-direction movement distribution. Even if the speaker is not captured within the image, the imaging control means can be moved so that the speaker is captured in the center part thereof, with a proper size.

DETAILED DESCRIPTION OF THE PREFERRED EMBODIMENTS

Embodiments of a teleconferencing system, and a camera controller and camera control method for a teleconferencing system according to the present invention are described in detail below, with references made to relevant accompanying drawings.

Figure 1:
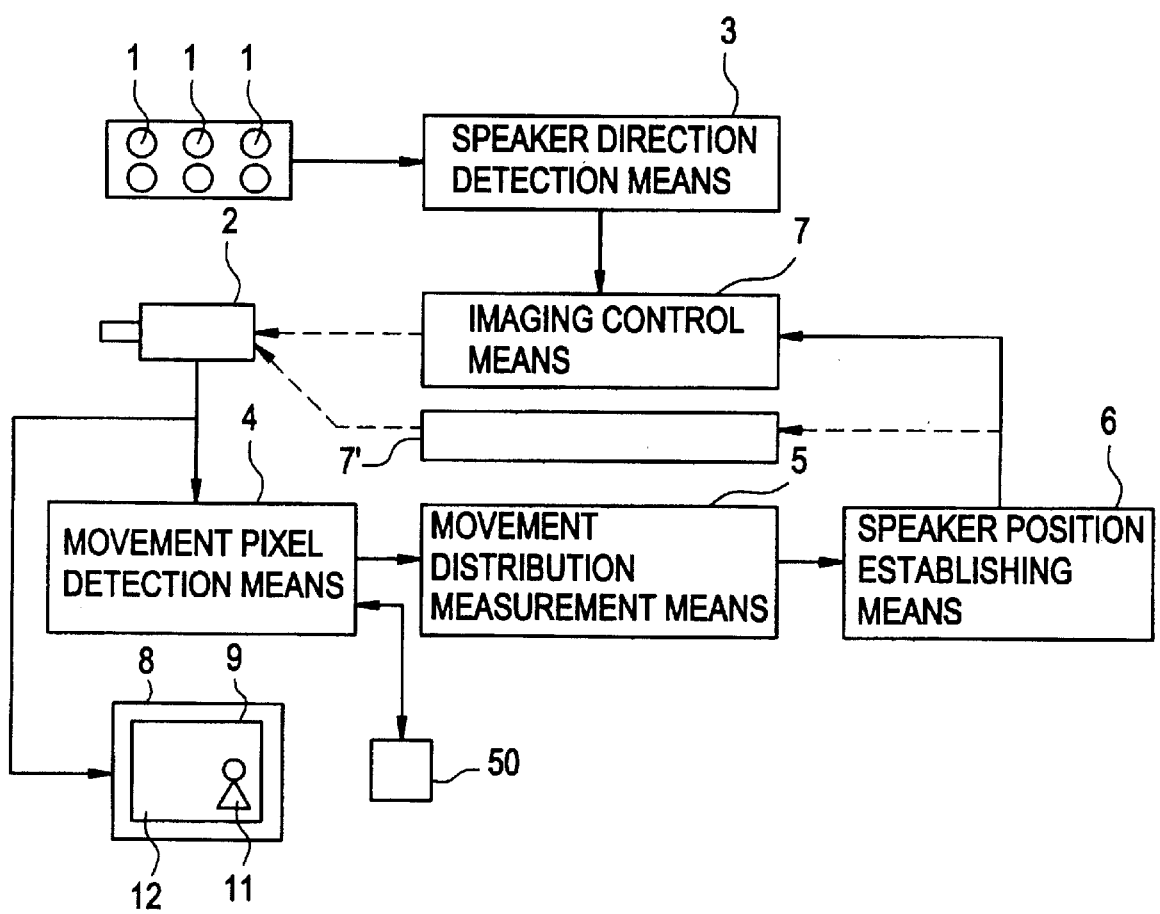
FIG. 1 is a block diagram illustrating a configuration of an example of a teleconferencing system according to the present invention.

Specifically, FIG. 1 is a block diagram showing the general configuration of an example of a teleconferencing system according to the present invention. This drawing shows a teleconferencing system 100 having a plurality of sound-collection means 1, at least one speaker-imaging means, e.g. a camera, 2, an imaging control means 7, which, based on voice direction information of a speaker obtained from the sound-collection means 1, changes the imaging direction of the speaker-imaging means 2, and an image-display means 8 displaying an image of a speaker. This teleconferencing system 100 is configured so that the imaging control means 7 directs the imaging direction of the speaker-imaging means 2 towards the predicted position of the speaker, predicted by the sound-collection means 1. Additionally, in the teleconferencing system 100, movement image pixels are extracted from the captured image 9 and the distribution of movement pixels thereof is determined, thereby identifying the position of a speaker on the image representation region 12, the position information of the speaker is used as the basis for further control of the imaging control means 7, so that the speaker 11 is displayed at a prescribed position in the image representation region 12.

That is, in terms of the specific configuration, the teleconferencing system 100 has a speaker direction detection means 3, which detects the direction of a speaker from phase differences of voices input to a plurality of sound-collection means, e.g. microphones, 1, and an imaging control means 7, which directs a camera in the detected direction.

This teleconferencing system 100 is additionally provided with a movement pixel detection means 4, which detects a moving part of the image information of the image captured by the camera 2, wherein one or both of the horizontal-direction and vertical-direction distributions of movement are measured by a movement distribution measurement means, and wherein a speaker position establishing means 6, that is, a speaker position establishing means 6 detects the position and size of a person, from the horizontal-direction and vertical-direction movement distributions.

In the present invention, in the case of determining whether the image of a speaker is within the captured image and where it exists therewithin, it is possible, without displaying the captured image on the above-noted image-display means 8, to perform processing by using an arbitrary storage circuit 50, which is either housed within an appropriate image processing circuit provided within the movement pixel detection means 4, or connected to the movement detection means 4.

It is also possible for the image-display means 8 to perform successive display of the above-noted speaker.

Even in the case in which the speaker is not positioned at a prescribed position, for example at the center part, or the captured image region, based on the detected position information of the speaker on the display screen, it is possible to perform control processing, such as adjustment and the like, in which a camera is directed or a zooming function is performed by the imaging control means 7, thereby enabling capture of the speaker in the center of the image, including appropriate adjustment of the size of the speaker image.

That is, in the case in which the speaker is not positioned within the captured image, by drawing back the zoom mechanism of the camera 2, which is the speaker-imaging means, it is possible to expand the imaging range, thereby enabling the speaker to be brought into the captured image.

Even in the case in which the speaker is already positioned within the captured image, when it is necessary to change the size of the speaker as displayed, it is possible in the same manner to perform control so as to zoom the zooming mechanism of the camera 2 in or out.

That is, one example of the configuration of a teleconferencing system 100 according to the present invention, for example, has a plurality of microphones 1 and a camera 2, the imaging angle and picture angle of which can be varied, and further can be a teleconferencing system having a speaker direction detection means 3, which detects the direction of a speaker, using the phase difference between microphones by means of voice data from the plurality of microphones 1, a movement pixel detection means 4, which, from an image captured by the camera 2, detects pixels of a moving object, a movement distribution measurement means 5, which can measure the distribution, in either one or both of the vertical and horizontal directions, of the pixels detected in a moving object, a speaker position establishing means capable of detecting the position and size of a person existing within an image, from the measured movement distribution, and an imaging control means 7, which is capable of performing control so as to direct the camera in the direction of a person as detected by the speaker direction detection means and the speaker position establishing means, and adjust the imaging angle of the camera.

Figure 2:
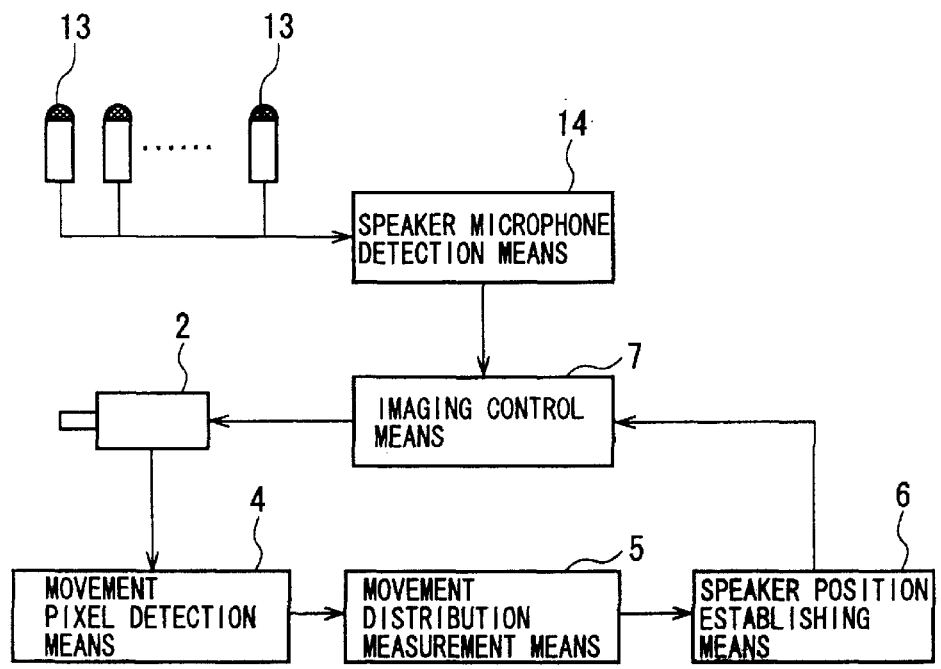
FIG. 2 is a block diagram illustrating a configuration of another example of a teleconferencing system according to the present invention.

FIG. 2 is a block diagram showing a second example of the present invention. That is, it is possible in a second example of a teleconferencing system 100 according to the present invention, as shown in FIG. 2, rather than using the phase difference of voices as noted above, to provide a speaker microphone detection means 14, which identifies the direction of a speaker as the direction of a microphone, of a plurality of microphones 1 disposed near each participant, which has the maximum voice level input.

In this example of the present invention, a plurality of microphones 13a to 13n are disposed near each participant.

The speaker microphone detection means 1 searches for the microphone with the maximum volume input from the microphones 13a to 13n, and requests the imaging control means 7 to direct the camera in the direction thereof.

The extraction of movement pixels in the displayed image 9, the measurement of the movement distribution, and the operation of correcting the speaker-imaging means 2 based on this measurement are the same as in the earlier noted first example of the present invention.

Thus, this example of the present invention is suited for the case in which the number of microphones corresponds to the number of meeting participants, and it is desirable to use the first example in other cases.

That is, in the present invention, although the available number of sound-collection means 1 can be the same as the number of teleconference participants, it is not absolutely necessary for the number sound-collection means 1 to match the number of teleconference participants.

As noted above, the voice direction information for a speaker can be predicted from the direction of the location of a speaker, using the phase difference between voices of speakers input to each of the sound-collection means 1, and it is also possible to predict that a speaker exists in a direction of a sound-collection means 1 from which the voice level is the maximum value of the plurality of sound-collection means 1.

There is no restriction placed on the speaker-imaging means 2 used in the present invention to capture an image of a speaker, and it is possible to used a known camera or the like, and it is desirable that the speaker-imaging means 2 have a configuration that enables the imaging direction to be arbitrarily directed in the horizontal direction and the vertical direction.

Additionally, it is desirable that the speaker-imaging means 2 have a zoom function.

Although the imaging control means 7 used in the present invention is shown as one and the same in FIG. 1 and FIG. 2, it is also possible for this imaging control means 7 to be divided between a first imaging control means 7 and a second imaging control means 7'.

That is, the first imaging control means 7 in the present invention can, for example, be a control means responding to a control signal output from the speaker microphone detection means 14, and performs coarse control of the speaker-imaging means 2, and can also be a zoom function control means that causes the size of the speaker image to change.

The second imaging control means 7' can be a control means that performs fine control of the speaker-imaging means 2 in response to a control signal output from the speaker position establishing means 6, and can also be a zoom function control means that causing the size of the speaker image to change.

In a teleconferencing system 100 according to the present invention, although not illustrated in the drawings, it is preferable that a method by which movement pixels are extracted from a captured image in which the speaker exits, which is captured by the speaker-imaging means 2, and by which a distribution of these movement pixels is determined by a differential image 31 from a plurality of continuous frames after an original image 30 making up the captured image, further determines a distribution image 32 of movement pixels that from the differential image 31, and then performs processing to identify the position 35 of the speaker 40 in the captured image.

That is, it is desirable in a teleconferencing system 100 according to the present invention that the movement pixel detection means 4 generates a differential image 31 between different captured image frames.

More specifically, the differential image 31 is calculated by causing storage of a captured image for each frame in an appropriate storage means 50 connected to the movement pixel detection means 4, and determination of the difference values either between different display image frames selected from a group of display image frames stored in the storage means 50, or between one display image frame stored in the storage means 50 and a display image frame currently displayed on the image-display means 8.

In the present invention, in order to effectively detect movement pixels, at least two display images used when determining the differential image 31 are temporally adjacent, and it is preferable that these are a plurality of display image frames separated by one or several frames, the difference values therebetween being determined.

While there is no particular restriction in the present invention with regard to the final position of a speaker on the captured image, it is desirable, for example, that the final position at which the speaker 40 is to be displayed in the captured image be at the approximate center part of the captured image 9.

Therefore, in a teleconferencing system 100 according to the present invention, by outputting information from the speaker position establishing means 6, in the case in which the position 35 of the recognized speaker 40 in the captured image is at an edge of the captured image, it is possible for the second imaging control means 7' to control the imaging means 2, so as to move the speaker image to the center of the captured image.

In this case, the second imaging control means 7' can make use of the zoom function of the speaker-imaging means 2 to arbitrarily adjust the size of the speaker 40 in the captured image.

In the teleconferencing system 100 according to the present invention, in one example of a method for determining the movement pixel distribution, a histogram 33 or 34 of the number of pixels in at least one direction of the vertical and horizontal directions in a captured image is determined, and the position of the speaker 40 within the captured image is determined from the size, density, or shape and the like of the histogram 33 or 34.

In the case in which the imaging direction of the speaker-imaging means 2 is directed at the predicted direction of the speaker, based on the voice direction information of the speaker from the sound-collection means 1, there is no speaker within the captured image, by operating the zoom function of the speaker-imaging means 2, for example by zooming out, so as to increase the captured area of the imaging region of the speaker-imaging means 2, the speaker is brought within the captured image, and in this condition the existence or non-existence of the speaker is again detected by a repeated execution of the above-noted operation.

A third example of a control apparatus 200 for a speaker imaging means in a teleconferencing system according to the present invention has a plurality of sound-collection means 1, a speaker-imaging means 2, which captures an image of a speaker, a speaker direction detection means 3, which predicts the position of a speaker based on information from the sound-collection means 1, a first imaging control means 7, which changes the facing direction of the speaker-imaging means 2, an image display means 8, which displays an image captured by the speaker-imaging means 2 that is caused to point in a prescribed direction in response to a control signal from the imaging control means 7, a movement pixel detection means 4, which detects movement pixels from the captured image, a movement distribution measurement means 5, which measures a movement distribution from movement pixels detected by the movement pixel detection means 4, a speaker position establishing means 6, which determines the position of a speaker within a captured image, based on the measurement results of the movement distribution measurement means 5, and a second imaging control means 7', which further controls the facing direction of the speaker-imaging means 2, based on information of the speaker position establishing means 6.

In a speaker-imaging means control apparatus 200 of a teleconferencing system according to the present invention, the first and second imaging control means 7 and 7' can be the same imaging controllers.

The method used to control the speaker-imaging means in a teleconferencing system according to the present invention is described in further detail below, with references made to the accompanying drawings, which show specific examples.

FIG. 1 is a block diagram showing a first example of the present invention, in which a teleconferencing system has a plurality of microphones 1, the voice data input to each being input to the speaker direction detection means 2.

The speaker direction detection means can detect the direction from which a sound arrives, that is, the direction of the speaker, from the phase differences between input voices and the positional relationship between the plurality of microphones.

The camera controller, this being the imaging control means 7 outputs a control signal so as to direct a camera 2, which serves as a speaker-imaging means, toward the predicted direction of a detected speaker, so that the camera controller 7 causes the camera to point in the requested direction.

In the present invention, there is a large error in detecting a person using the phase differences between voices, caused by the direction the speaker is facing and reflections from the walls of the meeting room, making it very difficult to capture the speaker accurately in the center of the image using the speaker direction detection means 1.

Figure 3:
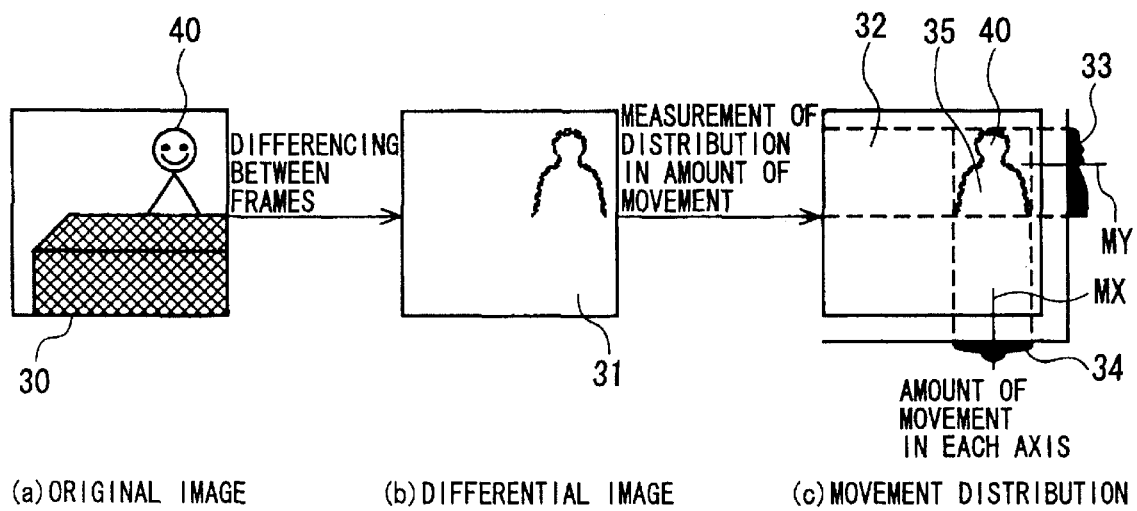
FIG. 3 is a drawing illustrating an example of a method for detecting a person by detecting movement within an image in a teleconferencing system according to the present invention.

For this reason, to detect a person region in an image captured by the speaker-imaging means 2, and perform correction so that the camera points in that direction. FIG. 3 shows the correction algorithm performed using this image.

That is, a video signal captured by the camera is input to the movement pixel detection means 4.

The intensity signal of the input image is expressed as Y (x, y, n), in which x and y represent the position of a pixel within the image, and n is a frame number.

At the movement pixel detection section 4, the frame differencing is used to extract a movement part of the image.

The differential image 31 of FIG. 3 (*b*) with respect to the original image 30 of FIG. 3 (*a*) is determined, and processing is performed to extract the moving part, that would correspond to a speaker.

The output D (x, y, n) of the differential image 31 is calculated as follows, using a pre-established threshold value T.

In a case when $$|Y(x, y, n)-Y(x, y, n-1)|<T \; D(x, y, n)=0$$

And in a case when $$|Y(x, y, n)-Y(x, y, n-1)|\geq T \; D(x, y, n)=1$$

In the above relationships, || indicates an absolute value.

The value of D is 1 for a pixel at which the speaker is moving, and 0 for a stationary pixel.

Although in the above, the immediately previous frame difference (n−1) is used to determine the frame differencing, it is also possible to use an even earlier frame.

In the case of using the immediately previous frame for the difference, because non-extraction of small movements can cause errors, for example, although using a more previous frame requires more storage area to store previous images, this is advantageous in achieving reliable extraction of a moving part.

The movement D (x, y, n) detected by the movement pixel detection means 4 is sent to the movement distribution measurement means 5, at which the vertical-direction and horizontal-direction movement distributions are measured.

This processing is done to determine the movement distribution of FIG. 3 (*c*) from the differential image of FIG. 3 (*b*).

If the horizontal-direction movement distribution is H (x, n) and the vertical-direction movement distribution is V (x, n), these are expressed as follows.

$$H(x, n) = \sum_{y=1}^{k} D(x, y, n)$$

$$V(y, n) = \sum_{x=1}^{w} D(x, y, n)$$

In the above relationships, w and h are the horizontal-direction size and the vertical-direction size.

The histograms 33 and 34 expressing the movement distributions are determined in this manner, these histograms exhibiting large values in parts at which the speaker is moving, and zero or nearly zero at background parts, where there is no movement.

At the speaker position establishing means 6, the H (x, n) and V (y, n) determined by the movement distribution measurement means 5 are used to detect the position of the speaker.

The horizontal-direction position of the speaker, at which H (x, n) has the maximum value, will be called MX.

Because the movement distribution value of H (x, n) becomes small as the distance from the maximum value of MX becomes greater, the range (MX1 to MX2) up until a point at which the value becomes somewhat smaller is taken as the range in the horizontal direction within which the person exists.

In the same manner, the range (MY1 to MY2) up to a point at which the vertical-direction distribution becomes somewhat smaller is taken as the range in the vertical direction within which the person exists.

The amount of horizontal movement (panning) of the camera can be calculated. Because MX1 and MX2 represent the position and size of the speaker, it is possible to calculate the amount of imaging angle and picture angle correction for the purpose of properly capturing the speaker within the screen.

It is possible to calculate the amount of movement of the camera from MY1 and MY2 in the vertical direction (tilt). The calculated pan, tilt, and picture angle are requested by the imaging control means 7 so as to capture the speaker, thereby enabling the capturing of the speaker in the center of the screen with an appropriate size.

Although in the above-noted example only the intensity signal Y (x, y, n) with regard to the frame differencing is used, because the intensity components of the background could be similar to those of clothing or skin, the movement detection accuracy using differencing increases if a color signal is used.

Additionally, unless a person is located within the image the processing after the movement pixel detection means 4 cannot correct the camera direction and picture angle, if in addition to requesting the imaging control means 7 to move the camera control is performed of the camera so as to sufficiently widen the picture angle, it is possible to reliably bring the speaker to within the screen. This picture angle can be adjusted in accordance with the amount of picture angle error in the detection of the voice direction.

A method for operating a control apparatus 200 for a speaker-imaging means in a teleconferencing system according to the present invention is described below as a fifth example, with reference made to FIG. 4.

Figure 4:
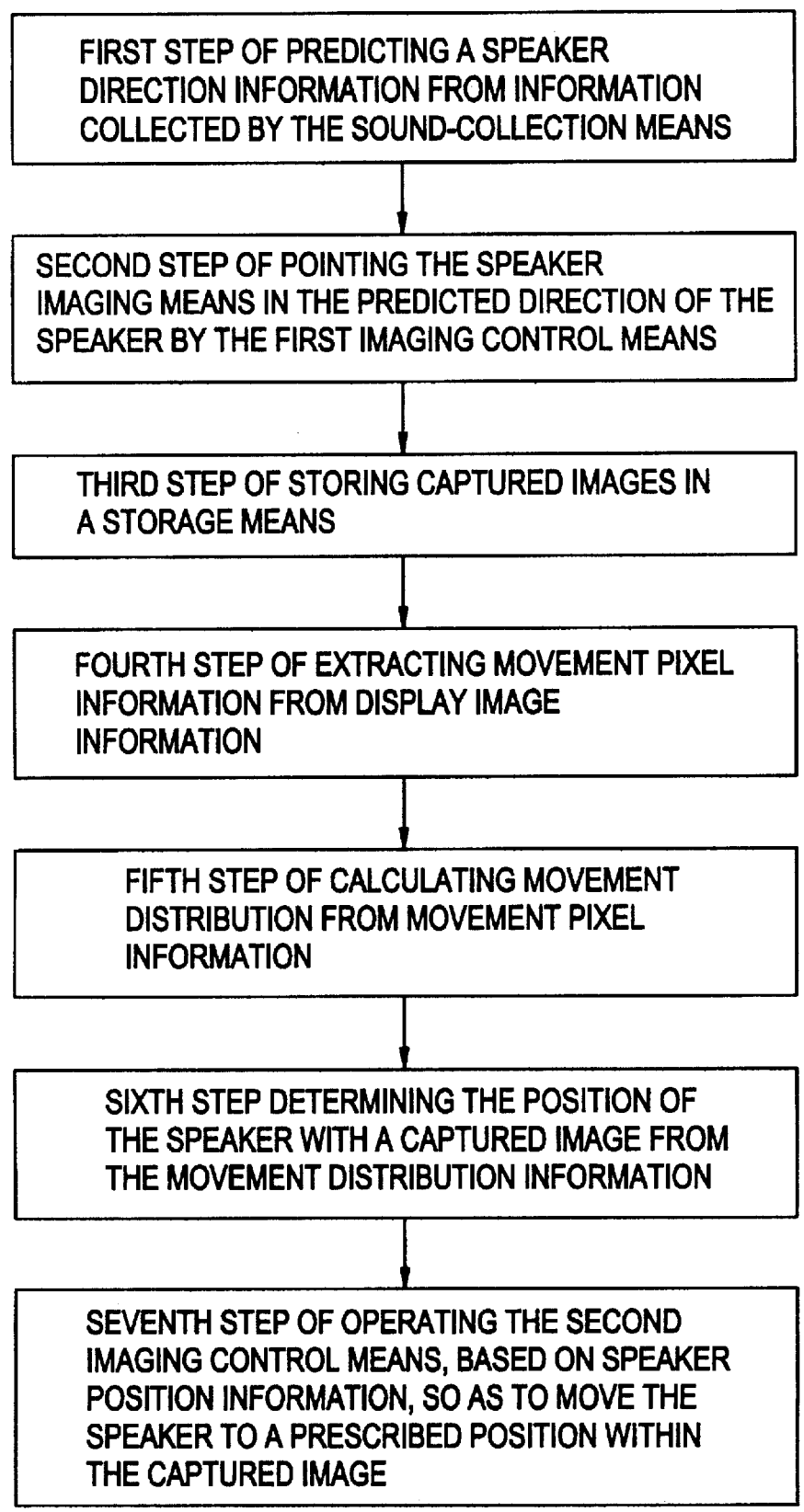
FIG. 4 is a flowchart illustrating a specific example of a method for image capturing of a speaker in a teleconferencing system according to the present invention.

Specifically, the operating procedure for a control apparatus for a speaker-imaging means in a teleconferencing system according to the present invention is a speaker-imaging means control method in a teleconferencing system 100, as shown in FIG. 4, having a plurality of sound-collection means 1, at least one speaker imaging means 2, and an imaging control means, which changes the imaging direction of the speaker-imaging means so as to capture an image of the speaker, based on direction information with regard to the speaker obtained from the sound-collection means 1, this method having a first step of predicting the direction of a speaker from information collected by each of the sound-collection means 1, a second step of causing the imaging direction axis of the speaker-imaging means 2 to be pointed at the predicted direction of the speaker by the first imaging control means 7 driving the speaker-imaging means 2, based on speaker direction information predicted in the first step, a third step of storing an image captured by the speaker-imaging means 2, a fourth step of extracting movement pixel information 31 from the stored image, a fifth step of calculating a movement distribution 32 from the extracted movement pixel information 31, a sixth step of determining the position of a speaker within the captured image, from the movement distribution information, and a seventh step of the second imaging control means 7' causing the speaker-imaging means 2 to move, based on position information of the speaker within a displayed image, so that the image of the speaker is moved to a prescribed position within the captured image.

In a control method for a speaker-imaging means in a teleconferencing system according to the present invention, it is possible for the first imaging control means 7 and the second imaging control means 7' to be one and the same controller, and based on the voice direction information of the speaker in the first step, to change imaging direction in the second step is determined by phase difference or voice level of the voices input by the plurality of sound-collection means 1 or 13.

It is desirable that the fourth step of extracting movement pixel information in the present invention can be performed by generating a differential image between different captured image frames.

The differential image 31 in the present invention is obtained by storing captured images successively into an appropriate storage means 50, and determining the differential image between different selected display image frames stored in the storage means 50 or between one image frame stored in the storage means 50 and the currently obtained display image frame.

It is desirable that the fifth step of calculating the movement distribution from movement pixel information extracted in the present invention is performed by forming a histogram with regard to pixel information for either the horizontal direction or the vertical direction, from extracted movement pixel information, comparing this histogram with a pre-established reference histogram, and verifying the position of the speaker within the captured image.

In this example of the present invention, it is possible if necessary to display the captured image within an image region 12 of the image display means 8.

Additionally, in the present invention, in the sixth step of determining the position of the speaker within the captured image from the movement information, in the case in which it is not possible to verify the position of the speaker, it is necessary to expand the region currently captured by the speaker-imaging means 2, and to repeat execution of the fourth to sixth steps.

More specifically, for example, a step whereby the region currently captured by the speaker-imaging means 2 is expanded is executed so as to effect zooming out in the speaker-imaging means.

In the present invention, it is possible to increase or decrease the size of the speaker in the image, by making arbitrary operation of the zoom operation.

A sixth example of the present invention is a control method for a speaker-imaging means in a teleconferencing system having a plurality of sound-collection means 1, at least one speaker imaging means 2, an image display means 8, and an imaging control means 7 for changing the imaging direction of the speaker-imaging means 2, which captures an image of a speaker, based on voice direction information obtained from the sound-collection means 1, this control means having a first step of predicting the direction of a speaker from information collected as voice sound by each sound-collection means 1, a second step of causing the imaging direction axis of the speaker-imaging means 2 to be pointed at the predicted position of the speaker by a first imaging control means 7 driving the speaker-imaging means 2, based on speaker direction information predicted in the first step, a third step of displaying an image captured by the speaker-imaging means 2 on an image display apparatus, a fourth step of extracting movement pixel information from the captured image information, a fifth step of calculating a movement distribution from the extracted movement pixel information, a sixth step of determining the position of a speaker within the captured image, form the movement distribution information, and a seventh 7' step of the second imaging control means 7 adjusting the zoom mechanism of the speaker-imaging means 2 in order to change the size of the speaker in the captured image, based on speaker position information within the captured image.

An example of the method of operating the control apparatus 200 for the speaker-imaging means in a teleconferencing system according to the present invention is described below as a seventh example, with references being made to the flowchart of FIG. 5.

Figure 5:
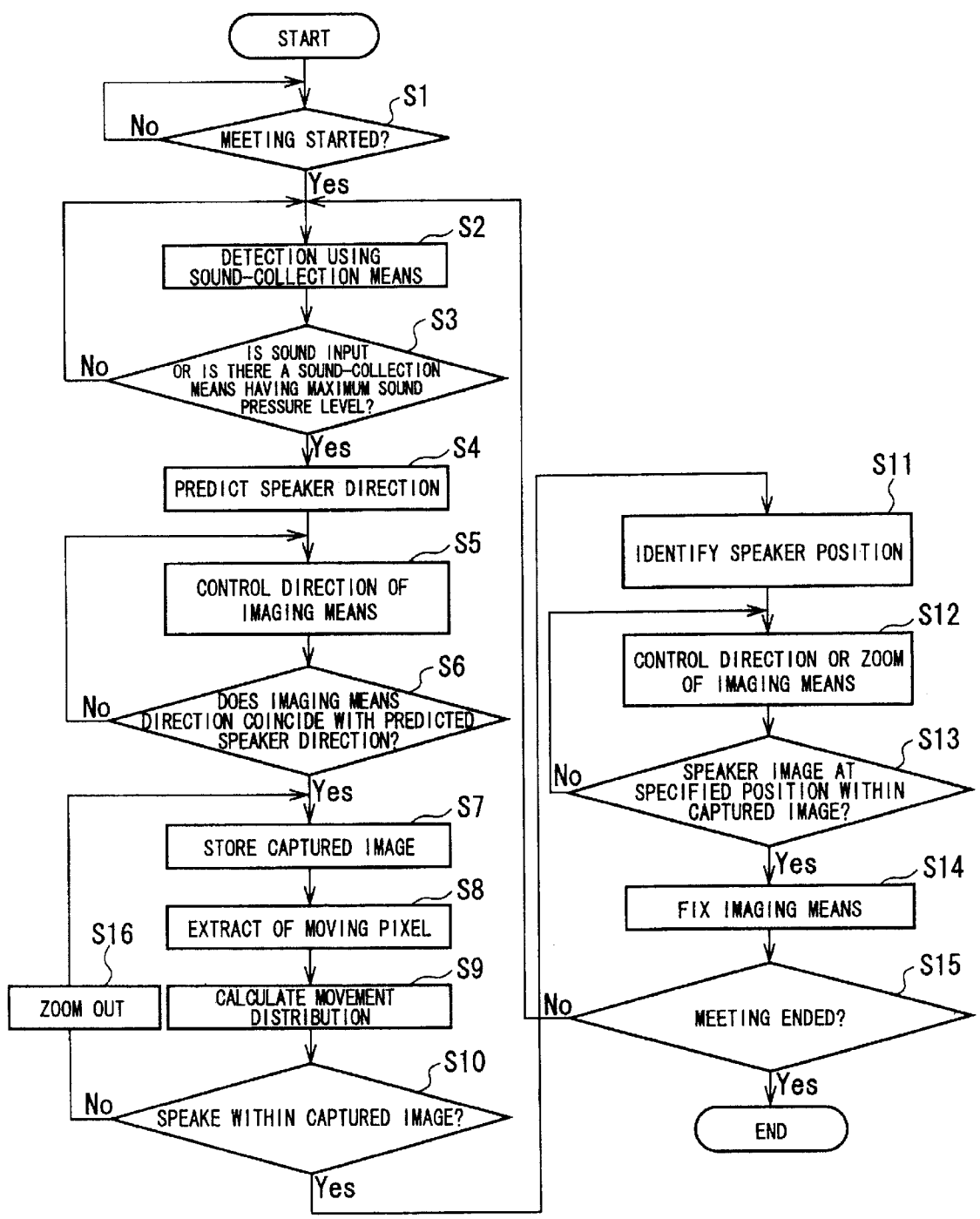
FIG. 5 is a flowchart illustrating another specific example of a method for image capturing of a speaker in a teleconferencing system according to the present invention.

Specifically, after START in FIG. 5, at step S1 a judgment is made as to whether or not a meeting has begun. If it has, control proceeds to step S2, at which monitoring is performed of the voice input condition of the sound-collection means 1 (13) and, at step S3, a judgment is made as to whether or not a sound is input to the sound-collection means 1 or whether the sound-collection means 1 has detected the maximum sound pressure level.

If the result at step S3 is NO, return is made to step S2, from which the above-noted processing is repeated. If the result at step S3 is YES, however, processing proceeds to step S4, at which the existence of a speaker in the direction of the sound-collection means 1 is predicted, and at step S5 the above-noted first imaging control means 7 is driven, so that the imaging direction axis of the imaging means 2 is caused to point in the predicted direction of the speaker, this processing corresponding the second step.

The, at step S6, a judgment is made as to whether or not the imaging direction of the imaging means 2 coincides with the predicted position of the speaker and, if the result is NO, processing of step S5 continues. If the result at step S6 is YES, however, control proceeds to step S7, at which the third step is executed, so as to store an image captured by the speaker-imaging means 2 as a captured image, after which control proceeds to step S8, at which the fourth step is executed, so that the movement pixel information 31 is extracted from the captured image.

After the above, at step S9 a calculation is made of the movement distribution 32 from the extracted movement pixel information 31.

Control proceeds next to step S10, at which a judgment is made as to whether or not the position of the speaker is within the captured image. If the result of this judgment is NO, control proceeds to step S16, at which the imaging means 2 is caused to perform a zoom operation (in this case, the main operation would be to zoom out), after which return is made to step S7, from which the above-noted operations are repeated.

If the result of the judgment at step S10 is YES, however, control proceeds to step S11, at which the sixth step is performed, so that the position 35 of the speaker within the captured image is determined, and then at step S12 the second imaging control means 7' causes the speaker-imaging means 2 to move based on position information of the speaker within the captured image, and a comparison is made with respect to a prescribed position of the speaker within the captured image, for example, the center of the captured image, and the second imaging control means 7' is caused to execute control of the speaker-imaging means 2.

At step S13, a judgment is made as to whether or not the position of the speaker coincides with a pre-established position within the captured image. It the result of this judgment is NO, the processing of step S12 is continued. If the result is YES, however, the speaker-imaging means 2 executes the second step at step S14.

After the above, control proceeds to step S15, at which a judgment is made as to whether or not the meeting has ended and, if the result of this judgment is NO, return is made to step S2, from which the above steps are repeated. If the result of this judgment was YES, however, the processing ends.

Another aspect of the present invention is a recording medium onto which is stored a program for execution by a computer of a speaker-imaging means control method in a teleconferencing system having a plurality of sound-collection means, at least one speaker imaging means, an image display means, and an imaging control means, which changes the imaging direction of the speaker-imaging means so as to capture an image of the speaker, based on direction information with regard to the speaker obtained from at least the sound-collection means, this method having a first step of predicting the direction of a speaker from information collected as voice sound by each of the sound-collection means, a second step of causing the imaging direction axis of the speaker-imaging means to be pointed at the predicted direction of the speaker by the first imaging control means driving the speaker-imaging means, based on speaker direction information predicted in the first step, a third step of storing an image captured by the speaker-imaging means, a fourth step of extracting movement pixel information from the stored captured image, a fifth step of calculating a movement distribution from the extracted movement pixel information, a sixth step of determining the position of a speaker within the captured image, from the movement distribution information, and a seventh step of the second imaging control means causing the imaging means to move, based on position information of the speaker within a displayed image, so that the image of the speaker is moved to a prescribed position within the captured image.

Yet another aspect of the present invention is a recording medium onto which is stored a program for execution by a computer of a speaker-imaging means control method in a teleconferencing system having a plurality of sound-collection means, at least one speaker imaging means, an image display means, and an imaging control means, which changes the imaging direction of the speaker-imaging means so as to capture an image of the speaker, based on direction information with regard to the speaker obtained from at least the sound-collection means, this method having a first step of predicting the direction of a speaker from information collected as voice sound by each of the sound-collection means, a second step of causing the imaging direction axis of the imaging means to be pointed at the predicted direction of the speaker by the first imaging control means driving the speaker-imaging means, based on speaker direction information predicted in the first step, a third step of storing an image captured by the speaker-imaging means, a fourth step of extracting movement pixel information from the stored image, a fifth step of calculating a movement distribution from the extracted movement pixel information, a sixth step of determining the position of a speaker within the captured image, from the movement distribution information, and a seventh step of the second imaging control means 7' causing the speaker-imaging means to move, based on position information of the speaker within a displayed image, so that the image of the speaker is moved to a prescribed position within the captured image.

By adopting the technical constitution described above, teleconferencing system, a speaker-imaging means control apparatus, and control method for a speaker-imaging means in a teleconferencing system according to the present invention reliably points a camera at a speaker when there is a speaker in a meeting, and further enable imaging of the speaker with a proper picture angle, thereby facilitating the holding of the meeting.

What is claimed is:

1. A teleconferencing system comprising:

a plurality of sound-collection means;

at least one speaker-imaging means;

an image-display means; and an imaging control means, which, based on voice direction information of a speaker obtained from said sound-collection means, changes an imaging direction of said speaker-imaging means imaging the speaker;

wherein said imaging control means is configured so as to perform control so as to direct said imaging direction of said speaker-imaging means toward a direction of said speaker predicted by said sound-collection means, and wherein said imaging control means is configured so that movement pixels are extracted from a captured image, and a distribution of the movement pixels is determined by determining an image differencing between a plurality of adjacent frames of said captured image, and determining a movement pixel distribution formed by movement pixels from a differential image using a histogram of a number of pixels with regard to each of a horizontal direction and a vertical direction in said captured image, and a position of said speaker in an image region is determined from said histogram so that, based on said position information of said speaker, further control is performed of said speaker-imaging control means so that said speaker is displayed at a prescribed position within said image region.

2. A teleconferencing system according to claim 1, wherein voice direction information of said speaker is used to predict a position of said speaker, making use of a phase difference between speaker voices input to said plurality of sound-collection means.

3. A teleconferencing system according to claim 1, wherein voice direction information of said speaker is used to predict a position of said speaker, a direction of one of said sound-collection means indicating a maximum value of voice level among the voice levels of said speaker input to each one of said plurality of said sound-collection means being taken as a direction of said speaker.

4. A teleconferencing system according to claim 3, wherein one of said plurality of sound-collection means is assigned to each said speaker.

5. A teleconferencing system according to claim 1, wherein the number of sound-collection means is different from the number of persons participating in said conference.

6. A teleconferencing system according to claim 1, wherein the imaging direction of said speaker-imaging means capturing an image of said speaker can be freely changed.

7. A teleconferencing system according to claim 1, wherein a final position at which said speaker is to be displayed within a displayed image is approximately the center of said displayed image.

8. A teleconferencing system according to claim 1, wherein in a case in which, based on voice direction information obtained from said sound-collection means, an imaging direction of said speaker-imaging means is directed toward a predicted direction of said speaker, if there is no speaker in said displayed image, a zoom function of said speaker-imaging means is caused to operate, so as to expand an imaging range of said speaker-imaging means, and the existence or non-existence of a speaker is detected again.

9. A teleconferencing system comprising:

a plurality of sound-collection means;

at least one speaker-imaging means;

an image-display means; and an imaging control means, which, based on voice direction information of a speaker obtained from said sound-collection means, changes an imaging direction of said speaker-imaging means imaging the speaker, wherein said imaging control means is configured so as to perform control so as to direct said imaging direction of said speaker-imaging means toward a direction of said speaker predicted by said sound-collection means, and wherein said imaging control means is configured so that movement pixels are extracted from a captured image, and a distribution of the movement pixels is determined by determining an image differencing between a plurality of adjacent frames of said captured image, and determining a movement pixel distribution formed by movement pixels from a differential image using a histogram of a number of pixels with regard to each of a horizontal direction and a vertical direction in said captured image, and a position of said speaker in said captured image is determined from said histogram, so as to identify said position of the speaker within said captured image, and so that, based on said position information of said speaker, further control is performed of said speaker-imaging means so that a size of said speaker at said position in an image region is adjusted.

10. A teleconferencing system according to claim 9, wherein said imaging control means operates a zoom mechanism of said speaker-imaging means.

11. A teleconferencing system according to claim 9, wherein voice direction information of said speaker is used to predict a position of said speaker, making use of a phase difference between speaker voices input to said plurality of sound-collection means.

12. A teleconferencing system according to claim 9, wherein voice direction information of said speaker is used to predict a position of said speaker, a direction of one of said sound-collection means indicating a maximum value of voice level among the voice levels of said speaker input to each one of said plurality of said sound-collection means being taken as a direction of said speaker.

13. A teleconferencing system according to claim 12, wherein one of said plurality of sound-collection means is assigned to each said speaker.

14. A teleconferencing system according to claim 9, wherein the number of sound-collection means is different from the number of persons participating in said conference.

15. A teleconferencing system according to claim 9, wherein the imaging direction of said speaker-imaging means capturing an image of said speaker can be freely changed.

16. A teleconferencing system according to claim 9, wherein a final position at which said speaker is to be displayed within a displayed image is approximately the center of said displayed image.

17. A teleconferencing system according to claim 9, wherein in a case in which, based on voice direction information obtained from said sound-collection means, an imaging direction of said speaker-imaging means is directed toward a predicted direction of said speaker, if there is no speaker in said displayed image, a zoom function of said speaker-imaging means is caused to operate, so as to expand an imaging range of said speaker-imaging means, and the existence or non-existence of a speaker is detected again.

18. An imaging means control apparatus in a teleconferencing system comprising:
   a plurality of sound-collection means;
   a speaker-imaging means, which captures an image of a speaker;
   a speaker direction detection means, which predicts a direction of said speaker based on information from said sound-collection means;
   a first imaging control means, which changes a facing direction of said speaker-imaging means, based on information of said speaker direction detection means;
   an image display means, which displays an image captured by said speaker-imaging means that is caused to face to a prescribed direction in response to a control signal from said first imaging control means;
   a movement pixel detection means, which detects movement pixels from said captured image;
   a movement distribution measurement means, which measures a movement distribution from movement pixels detected by said movement pixel detection means and creates a histogram with regard to pixel information for each of a horizontal direction and a vertical direction, from said detected movement pixel information;
   a speaker position establishing means, which determines said position of a speaker within said image, based on the measurement results of said movement distribution measurement means; and
   a second imaging control means, which further controls a facing direction of said speaker-imaging means, based on information of said speaker position establishing means.

19. A control apparatus according to claim 18, wherein said first imaging control means and said second imaging control means are one the same imaging control means.

20. A control apparatus according to claim 18, wherein said speaker direction detection means predicts a direction of a speaker based on either a phase difference or a voice level of speaker voices input to said plurality of sound-collection means.

21. A control apparatus according to claim 18, wherein said movement pixel detection means creates an image differencing from different captured image frames.

22. A control apparatus according to claim 21, wherein said differential image is created by causing storage of successively captured display images for each frame in an appropriate storage means, and determining a differential image either between different selected display image frames from said stored display image frames, or between one display image frame stored in said storage means and a currently obtained display image frame.

23. A control apparatus according to claim 18, wherein said speaker position establishing means verifies a position of a speaker on a display image from said histogram formed by said distribution measurement means.

24. A control apparatus according to claim 18, wherein said speaker position establishing means, in a case in which it is not possible to verify a position at which a speaker exists, expands the region currently imaged by said speaker-imaging means, and from the results executes a verification of said speaker position on said captured image.

25. An imaging means control apparatus in a teleconferencing system comprising:
   a plurality of sound-collection means; a speaker-imaging means, which captures an image of a speaker;
   a speaker direction detection means, which predicts a direction of said speaker based on information from said sound-collection means;
   a first imaging control means, which changes a facing direction of said speaker-imaging means, based on information of said speaker direction detection means;
   an image display means, which displays an image captured by said speaker-imaging means that is caused to face to a prescribed direction in response to a control signal from said first imaging control means;
   a movement pixel detection means, which detects movement pixels from said captured image;
   a movement distribution measurement means, which measures a movement distribution from movement pixels detected by said movement pixel detection means and creates a histogram with regard to pixel information for each of a horizontal direction and a vertical direction, from said detected movement pixel information;
   a speaker position establishing means, which determines said position of a speaker within said image, based on the measurement results of said movement distribution measurement means; and
   a second imaging control means, which further controls said speaker-imaging to change a size of said speaker on said image, based on information of said speaker position establishing means.

26. A control apparatus according to claim 25, wherein said first imaging control means and said second imaging control means are one the same imaging control means.

27. A control apparatus according to claim 25, wherein said speaker direction detection means predicts a direction of a speaker based on either a phase difference or a voice level of speaker voices input to said plurality of sound-collection means.

28. A control apparatus according to claim 25, wherein said movement pixel detection means creates an image differencing from different captured image frames.

29. A control apparatus according to claim 28, wherein said differential image is created by causing storage of successively captured display images for each frame in an appropriate storage means, and determining a differential image either between different selected display image frames from said stored display image frames, or between one display image frame stored in said storage means and a currently obtained display image frame.

30. A control apparatus according to claim 25, wherein said speaker position establishing means verifies a position of a speaker on a display image from said histogram formed by said distribution measurement means.

31. A control apparatus according to claim 25, wherein said speaker position establishing means, in a case in which it is not possible to verify a position at which a speaker exists, expands the region currently imaged by said speaker-imaging means, and from the results executes a verification of said speaker position on said captured image.

32. A control apparatus according to claim 25, wherein control by said second imaging control means is performed so as to operate a zoom mechanism of said speaker-imaging means.

33. An imaging means control method in a teleconferencing system comprising a plurality of sound-collection means, at least one speaker imaging means, and a imaging control means, which changes an imaging direction of said speaker-imaging means so as to capture an image of the speaker, based on voice direction information with regard to the speaker obtained from said sound-collection means, said method comprising:

a first step of predicting a direction of a speaker from information collected as voice sound by each of said sound-collection means;

a second step of causing an imaging direction axis of said speaker-imaging means to be faced to said predicted direction of said speaker by a first imaging control means driving said speaker-imaging means, based on speaker direction information predicted in said first step;

a third step of displaying an image captured by said speaker-imaging means on a display means;

a fourth step of extracting movement pixel information from said displayed image information;

a fifth step of calculating a movement distribution from said extracted movement pixel information by determining an image differencing between a plurality of adjacent frames of said captured image, and determining a movement pixel distribution formed by movement pixels from a differential image using a histogram of a number of pixels with regard to each of a horizontal direction and a vertical direction in said captured image;

a sixth step of determining a position of said speaker within said captured image from said movement distribution information; and a seventh step of a second imaging control means causing said speaker-imaging means to move, based on position information of the speaker within a displayed image, so that said image of said speaker is moved to a prescribed position within said captured image.

34. An imaging means control method in a teleconferencing system comprising a plurality of sound-collection means, at least one speaker imaging means, and a imaging control means, which changes an imaging direction of said speaker-imaging means so as to capture an image of the speaker, based on voice direction information with regard to the speaker obtained from said sound-collection means, said method comprising:

a first step of predicting a direction of a speaker from information collected as voice sound by each of said sound-collection means;

a second step of causing an imaging direction axis of said speaker-imaging means to be faced to said predicted direction of said speaker by a first imaging control means driving said speaker-imaging means, based on speaker direction information predicted in said first step;

a third step of displaying an image captured by said speaker-imaging means on a display means;

a fourth step of extracting movement pixel information from said displayed image information;

a fifth step of calculating a movement distribution from said extracted movement pixel information by determining an image differencing between a plurality of adjacent frames of said captured image, and determining a movement pixel distribution formed by movement pixels from a differential image using a histogram of a number of pixels with regard to each of a horizontal direction and a vertical direction in said captured image;

a sixth step of determining a position of said speaker within said captured image from said movement distribution information; and a seventh step of a second imaging control means adjusting a zoom mechanism of said speaker-imaging means so as to adjust a size of said speaker in said captured image based on position information of the speaker within a displayed image.

35. A recording medium onto which is stored a program for execution by a computer of an imaging means control method in a teleconferencing system comprising a plurality of sound-collection means, at least one speaker imaging means, and an imaging control means, which changes an imaging direction of said speaker-imaging means so as to capture an image of the speaker, based on voice direction information with regard to the speaker obtained from said sound-collection means, said method comprising:

a first step of predicting a direction of a speaker from information collected as voice sound by each of said sound-collection means;

a second step of causing an imaging direction axis of said speaker-imaging means to be pointed at said predicted position of said speaker by a first imaging control means driving said speaker-imaging means, based on speaker direction information predicted in said first step;

a third step of storing an image captured by said speaker-imaging means;

a fourth step of extracting movement pixel information from said stored image;

a fifth step of calculating a movement distribution from said extracted movement pixel information by determining an image differencing between a plurality of adjacent frames of said captured image, and determining a movement pixel distribution formed by movement pixels from a differential image using a histogram of a number of pixels with regard to each of a horizontal direction and a vertical direction in said captured image;

a sixth step of determining a position of said speaker within said captured image from said movement distribution information; and a seventh step of a second imaging control means causing said speaker-imaging means to move, based on position information of the speaker within a displayed image, so that said image of said speaker is moved to a prescribed position within said captured image.

36. A recording medium onto which is stored a program for execution by a computer of an imaging means control method in a teleconferencing system comprising a plurality of sound-collection means, at least one speaker imaging means, and an imaging control means, which changes an imaging direction of said speaker-imaging means so as to capture an image of the speaker, based on voice direction information with regard to the speaker obtained from said sound-collection means, said method comprising:

a first step of predicting a direction of a speaker from information collected as voice sound by each of said sound-collection means;

a second step of causing an imaging direction axis of said speaker-imaging means to be pointed at said predicted position of said speaker by a first imaging control means driving said speaker-imaging means, based on speaker direction information predicted in said first step;

a third step of storing an image captured by said speaker-imaging means;

a fourth step of extracting movement pixel information from said stored image;

a fifth step of calculating a movement distribution from said extracted movement pixel information by determining an image differencing between a plurality of adjacent frames of said captured image, and determining a movement pixel distribution formed by movement pixels from a differential image using a histogram of a number of pixels with regard to each of a horizontal direction and a vertical direction in said captured image;

a sixth step of determining a position of said speaker within said captured image from said movement distribution information; and a seventh step of a second imaging control means adjusting a zoom mechanism of said speaker-imaging means so as to adjust a size of said speaker in said captured image.

* * * * *